(12) United States Patent
Li et al.

(10) Patent No.: US 10,503,691 B2
(45) Date of Patent: Dec. 10, 2019

(54) ASSOCIATIVE COMPUTER PROVIDING SEMI-PARALLEL ARCHITECTURE

(71) Applicant: Wisconsin Alumni Research Foundation, Madison, WI (US)

(72) Inventors: Jing Li, Madison, WI (US); Soroosh Khoram, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 257 days.

(21) Appl. No.: 15/334,398

(22) Filed: Oct. 26, 2016

(65) Prior Publication Data

US 2018/0113839 A1 Apr. 26, 2018

(51) Int. Cl.
*G06F 7/38* (2006.01)
*G06F 15/78* (2006.01)

(52) U.S. Cl.
CPC ............ *G06F 15/7839* (2013.01); *G06F 7/38* (2013.01); *G06F 15/7821* (2013.01)

(58) Field of Classification Search
CPC ..... G06F 15/7839; G06F 15/7821; G06F 7/38
See application file for complete search history.

(56) References Cited

PUBLICATIONS

L. Yavits, S. Kvatinsky, A. Morad and R. Ginosar, "Resistive Associative Processor," in IEEE Computer Architecture Letters, vol. 14, No. 2, pp. 148-151, Jul.-Dec. 1, 2015. (Year: 2015).*
I. Koren, "Digital Computer Arithmetic, Part 5a, Fast Addition" (Year: 2008).*

* cited by examiner

*Primary Examiner* — Benjamin P Geib
*Assistant Examiner* — Kasim Alli
(74) *Attorney, Agent, or Firm* — Boyle Fredrickson, S.C.

(57) ABSTRACT

An associative processor separates the arithmetic operation of addition from the carry process to pre-compute contingent carries before the addition which then allows improved parallelism in the addition process. A portion of the contingent carry computation may also be conducted in parallel. The result is higher-speed operations resulting from increased parallelism.

18 Claims, 5 Drawing Sheets

ASSOCIATIVE COMPUTER PROVIDING SEMI-PARALLEL ARCHITECTURE

BACKGROUND OF THE INVENTION

The present invention relates to computer architectures and in particular to an associative computer providing improved parallelism.

Widely used von Neumann-type computer architectures, in which one or more processors communicate with a separate memory holding instructions and data, face a technical limitation termed the "von Neumann bottleneck". The von Neumann bottleneck relates to the communication channel between the processors and the memory required for each transfer of instructions and data and which fundamentally limits computer execution speed.

One solution to this bottleneck may be found in computer architectures using "processing-in-memory" (PIM). Processing-in-memory architectures, as the name implies, endeavor to operate on data without moving the data out of memory into the processors and thus avoid the von Neumann bottleneck.

One variant of these latter architectures is the associative processor (AP). An associative processor is constructed using an associative memory of a type permitting parallel searching and writing to multiple memory words. This searching and writing can be used to implement operations on the data in the memory without transferring that data. Generally, an associative processor operates in parallel on multiple words in memory each holding two operands. The associative processor sequentially applies search patterns to these operands where each search pattern represents an operand pattern consistent with a particular operation result. As particular operand patterns are identified, the corresponding results may be written to the identified words. By operating in parallel on each of these operands, and associative processor may implement high-speed "single instruction, multiple data" (SIMD) processing.

For example, a two-bit addition (without carry-in) can be decomposed into four basic patterns of operands (00, 01, 10, and 11) each associated with a particular result (0, 1, 1, 0 with carry). Four successive searches maybe conducted simultaneously on all the words of the memory for these four basic patterns. Once a pattern is found, the corresponding result is written to that word effectively computing the operation results for each word.

In practice, the number of patterns that must be searched increases with the consideration of carry-in bit $C_{in}$; however, this increased number of patterns can then be further reduced by eliminating patterns that do not change a default result value (e.g., zero) limiting the total number of patterns that need to be considered for addition to around five. The time required to test for and write the results for each pattern of an operation is more than offset by the extremely large number of words that can be simultaneously processed.

New generations of content addressable memories employing, for example, phase change memory or resistive memory elements make associative processors more attractive on a cost basis. Such content addressable memories are currently used for network switches and the like which require high-speed network address lookup, or applications such as machine learning. As required for associative processing, these content addressable memories provide multiple words of storage that can be simultaneously searched or simultaneously written to. Each word is associated with a tag bit that is set when a search applied to that word matches.

The tag bits can be used to control subsequent write operations so that data words can be changed based on the results of the previous search.

An associative processor using a content addressable memory may simultaneously search its data words for operands matching successive patterns of an operation. Where matches occur, tag bits are set and used to control a subsequent writing of results to those matching data words.

SUMMARY OF THE INVENTION

While associative processors operate in parallel on each data word, this parallel operation is interrupted by the need to compute carry bits (for example, during addition of operands) in bit-serial fashion from lower order bits of each operand to the higher order bits. Thus for example, five search patterns may be first applied to the least significant bit of the operands to compute a result and a carry out bit. This carry out bit is then used during the application of five search patterns to the next more significant bit to compute a result and a carry out bit and so forth.

The present inventors have recognized that the time and cost of propagating carry bits can be greatly reduced by separating the operands into "subwords" and performing a "contingent" propagation of the carry bits in parallel within subwords. A limited "actual" carry propagation can then occur between subwords allowing the subsequent computational operation to be performed in parallel on the subwords. The net result is to substantially reduce the number of searches that must be conducted in bit-serial fashion across the entire word.

The "contingent" propagation of the carry bits determines a carry propagation for both cases of a carry-in bit $C_{in}$ being 0 or 1. This can be performed in parallel among the subwords. The actual carry propagation across the entire word then simply applies an initial carry-in value $C_{in}$ to each of these contingent carry relationships for each subword providing a greatly accelerated carry bit propagation (for example, equal to the number of subwords rather than the number of bits in the word).

Specifically then, the present invention provides an associative processor having a plurality of rows of content addressable memory and a controller communicating with the rows to search the rows in parallel for a pattern and to write to the rows in parallel according to a pattern. The controller operates to load each row with two words representing addends to be summed, each word including multiple subwords. The controller next applies search and write cycles to the subwords using first predetermined patterns to determine whether an addition of the subwords would produce a carry-out bit under both states of an assumed carry-in bit of one and an assumed carry-in bit of zero to determine a contingent carry relationship of each subword. Next the controller applies search and write cycles to the subwords using second predetermined patterns to propagate carry bits through the subwords according to the contingent carry relationship of each subword and a carry-in bit of zero for the least significant subwords. Finally the controller applies search and write cycles on the subwords using third predetermined patterns to add corresponding subword using the propagated carry bits.

It is thus a feature of one embodiment of the invention to separate carry propagation from the search as required for other steps of the operation thereby allowing a greater degree of parallelism in an associative processor.

The associative processor may compute the contingent carry relationships on multibit subwords in parallel.

It is thus a feature of one embodiment of the invention to recast the carry process so that a portion of the carry process can be computed in parallel on different subwords.

The associative processor may compute the actual carry on multibit subwords in series.

It is thus a feature of one embodiment of the invention to limit the number of actual carry steps to the number of subwords rather than the number of bits in the word.

The associative processor computes the addition of multibit subwords in parallel.

It is thus a feature of one embodiment of the invention to provide parallel addition in multiple subwords by pre-computation of carry bits.

The subwords may have multiple bits of each operand. In one example, where words are of length m and each subword has a bit length of 1, the number of bits may approximately conform to the following equation:

$$\frac{m}{l} = \frac{3}{\sqrt{2}} \sqrt{m}.$$

In one example, the words are of length 64 and the subwords may have a bit length of four.

It is thus a feature of one embodiment of the invention to provide flexible optimization of the number of bits in a subword.

In one extreme, the subwords have only a single bit of each operand bit.

It is thus a feature of one embodiment of the invention to provide increased parallelism where additional word memory is available.

The first predetermined patterns used for determining the contingent carry relationships maybe limited to two patterns identifying whether corresponding bits of a subword are identical being either both ones or both zeros.

It is thus a feature of one embodiment of the invention to provide a compact search pattern for a contingent carry relationship determination greatly reduced from the search pattern required for the operation.

The third predetermined patterns maybe limited to patterns in which the addend bits produce a result different from a default result loaded into the words. In one embodiment, the patterns may be those unique patterns associated with carry-free addition.

It is thus a feature of one embodiment of the invention to provide a further reduced set of patterns for addition including reductions possible because the carry process has been separated from the addition process.

The associative processor may include a tag bit associated with each subword.

It is thus a feature of one embodiment of the invention to provide an architecture that permits subword parallel processing.

The associative processor may further include a tag bit associated with each word operating to be set or reset depending on a search applied to the associated word and selectively control the writing of the associated word according to whether it is set or reset and communicating with other tag bits in a reduction tree circuit.

It is thus a feature of one embodiment of the invention to permit both subword and word parallel processing.

These particular objects and advantages may apply to only some embodiments falling within the claims and thus do not define the scope of the invention.

DETAILED DESCRIPTION OF THE PREFERRED EMBODIMENT

Figure 1:
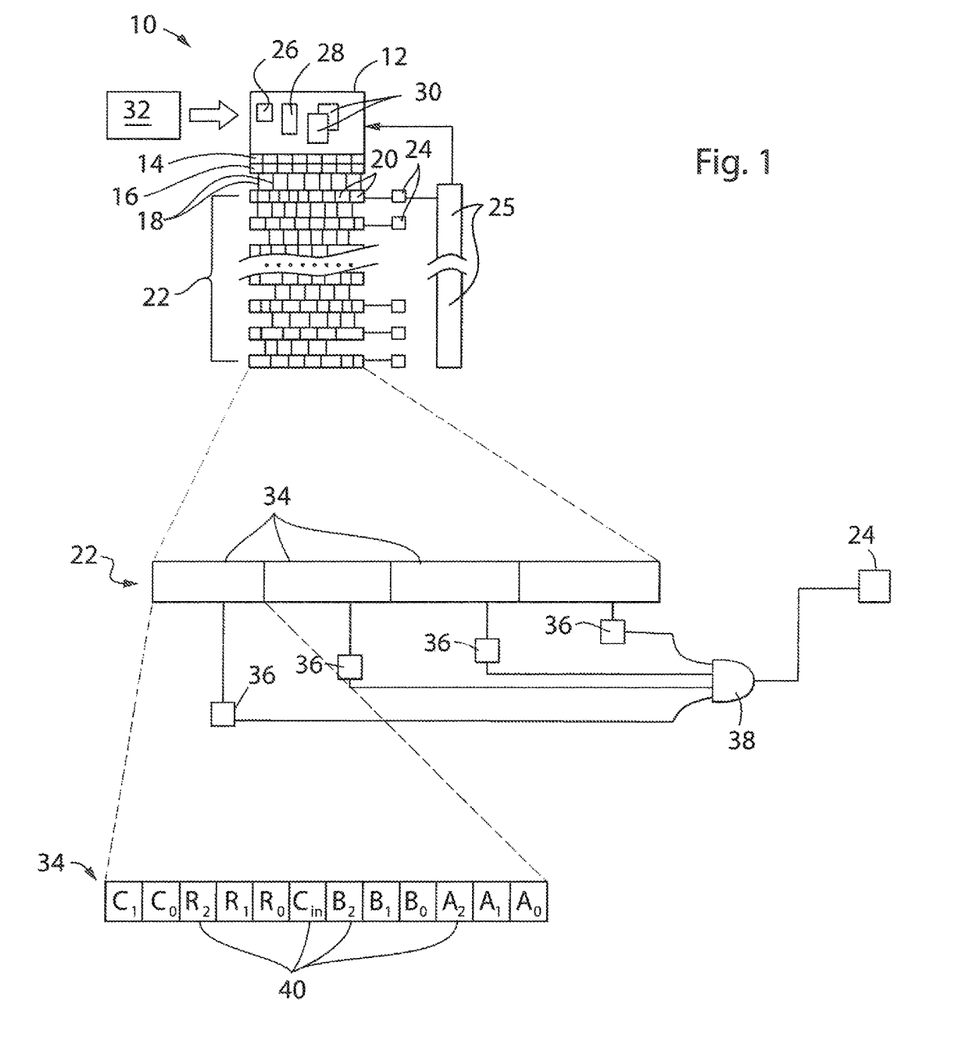
FIG. 1 is a block diagram of an associative processor according to the present invention showing a controller unit communicating through a key and a masked register with multiple data words each associated with a tag and received by a reduction tree circuit, and further showing an expansion of each data word to show subwords and subtags together with an arrangement of data logically in the subwords.

Referring now to FIG. 1, an associative processor 10 constructed according the present invention may provide for a control unit 12 that can communicate through a key register 14 and a mask register 16 with multiple data lines 18 communicating in parallel with a plurality of words 22. As depicted for simplicity, the key register 14 and mask register 16 may each have a bit length equal to the bit length of the words 22. Alternatively, the key register 14 and mask register 16 may have a width equal to a subword as described below to reduce register sizes. In this latter case, the key register 14 and mask register 16 are reused among subword operations.

Each of the words 22 may be associated with a word tag bit 24. The word tag bits 24 may be set automatically in response to a search producing a match on a respective word 22 associated with the word tag bit 24. Likewise, the word tag bits 24 may control whether its associated word 20 is subject to a subsequent writing. Together the word tag bits 24 provide outputs to a reduction tree circuit 25 which may provide additional processing of the data of the word tag bits 24, for example, to identify a first set of word tag bits 24 of all of the set tag bits 24 or may count the number of set tag bits 24 or perform other Boolean operations on the received data from the tag bits 24.

The control unit 12 may employ one or more conventional computer processors 26 or functionally similar discrete circuitry executing a stored operating program 28, which will be described below, to implement one or more arithmetic operations on the words 22. In this regard, the program 28 may make use of stored patterns 30 describing values of the key register 14 and mask register 16 used in sequences of searches and writes of the words 22 to implement the desired operations.

Generally, the control unit 12 may also communicate with an external processing system 32 to receive an application program having instructions which may be decoded and executed by the control unit 12 and to receive data for the initial loading of the words 22. The program 28 may be implemented either as software or as firmware.

Each of the words 22 may be subdivided into subwords 34 whose length will be optimized as discussed below. In one example, a 64-bit word 22 may provide for four 16-bit subwords 34. Each subword 34 is also associated with a subword tag bit 36 whose output may be received by a circuit 38 providing the value of word tag bit 24.

The program 28 may generally provide for search and write functions typical of a ternary content addressable memory. A search operation may search for a pattern described by a pattern of 0's and 1's loaded into the key register 14 equal in length to the bit length of the words 22. The mask register 16 provides corresponding bits that "mask" bits of the key register 14 so that only bits of the key register 14 associated with 1's in the mask register 16 are involved in the search making the other bits essentially "don't care" or wildcard search bits.

The pattern implemented by the key register 14 and masked register 16 is applied in parallel to each of the words 22, and subword tag bits 36 are set for each subword 34 matching a corresponding subword portion of the pattern, and word tag bits 24 are set for each word 22 that matches the entire search pattern.

Each subword 34 may include one or more bit sets 40 each representing one bit 44 of a first and second operand (A, B) that will be operated upon together with a result bit (R). Generally each subword 34 will provide for successive bit order portions of the operands. Each subword 34 will also include a carry-in bit ($C_{in}$) and contingent carry relationship bits ($C_0$, $C_1$) shared among the bit sets 40. In the limiting case where a subword 34 contains only a single bit of the first and second operands (A, B), the carry-in bit ($C_{in}$) and contingent carry relationship bits ($C_0$, $C_1$) are associated with only those single bits.

While a particular arrangement of these various subwords 34 and bit sets 40 is depicted, it should be understood that the ordering and grouping of the data into subwords 34 and bit sets 40 is logical only and the actual physical arrangement of the data within the word may be freely changed.

Figure 2:
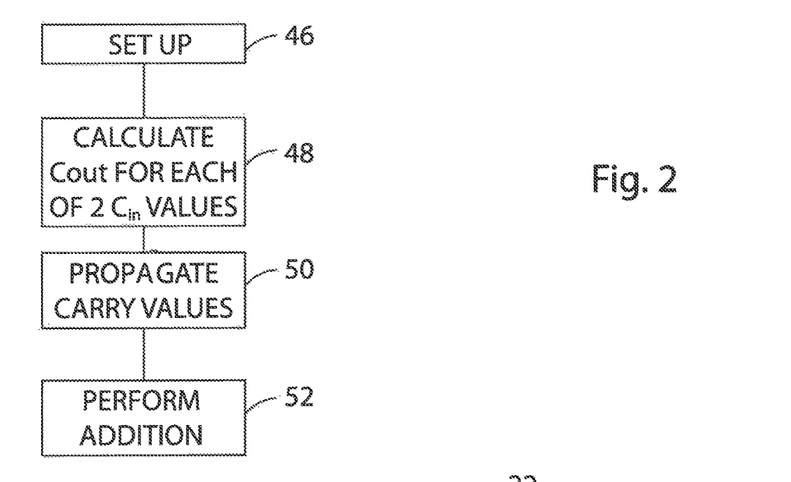
FIG. 2 is a top-level flowchart of the principal steps of the operation of the controller unit in implementing an addition in the multiple data words including set up, contingent carry relationship calculation, carry propagation, and addition.

FIG. 2 provides an overview of the steps of an example addition of two multibit operands (A, B). It will be appreciated that the addition operation as will be described can also be used to implement other arithmetic operations founded on addition (e.g., multiplication, subtraction, and division). The steps will be described in more detail further below.

At a first step, indicated by process block 46, memory words 22 may be loaded with data partitioned as subwords 34 each holding operands A and B. This data may be obtained from external processing system 32, for example.

At succeeding process block 48, a contingent carry relationship is calculated for each subword 34 as will be discussed in more detail below. This contingent carry relationship calculates a carry-out $C_{out}$ bit for each subword 34 for two different cases: a first case where a carry-in bit $C_{in}$ for the subword 34 is 0 and the second case where the carry-in bit $C_{in}$ for the subword 34 is 1.

Within each subword 34, this process is "bit serial". That is, within each subword 34, contingent carry relationships must be determined in series for successive bits in the operands A and B. These contingent carry relationships are used to compute a contingent carry relationship for the entire subword 34. Between each subword 34, this process is "subword parallel". That is, the contingent carry relationships may be computed at the same time among subwords 34. The calculation of the contingent carry relationship does not perform the addition operation and for this reason is much faster and requires fewer searches than the actual addition operation.

At succeeding block 50, actual carry values are propagated through the subwords 34 by assuming the carry-in $C_{in}$ input to the first or least significant subwords 34 is 0 (or some other predetermined value) and using the previously determined contingent carry relationships for each subword 34 to compute actual carry-out $C_{out}$ values for each of the subwords 34 (recorded as the $C_{in}$ values of the succeeding subword 34). This propagation requires successive operations only equal to the number of subwords 34 and thus may be fewer than the number of bits of the operands A and B.

Finally, at process block 52, the operation (e.g., addition) is performed without calculation of carry values which have previously been determined at process block 50. This calculation may be performed in parallel between the subwords 34 of each word 22 but occurs in bit serial form within each subword 34 so that intervening carry values for each bit of the arguments A and B can be determined. The number of computational steps provided by this process will be discussed below with respect to FIGS. 5 and 6 after the steps are described in more detail.

Figure 3:
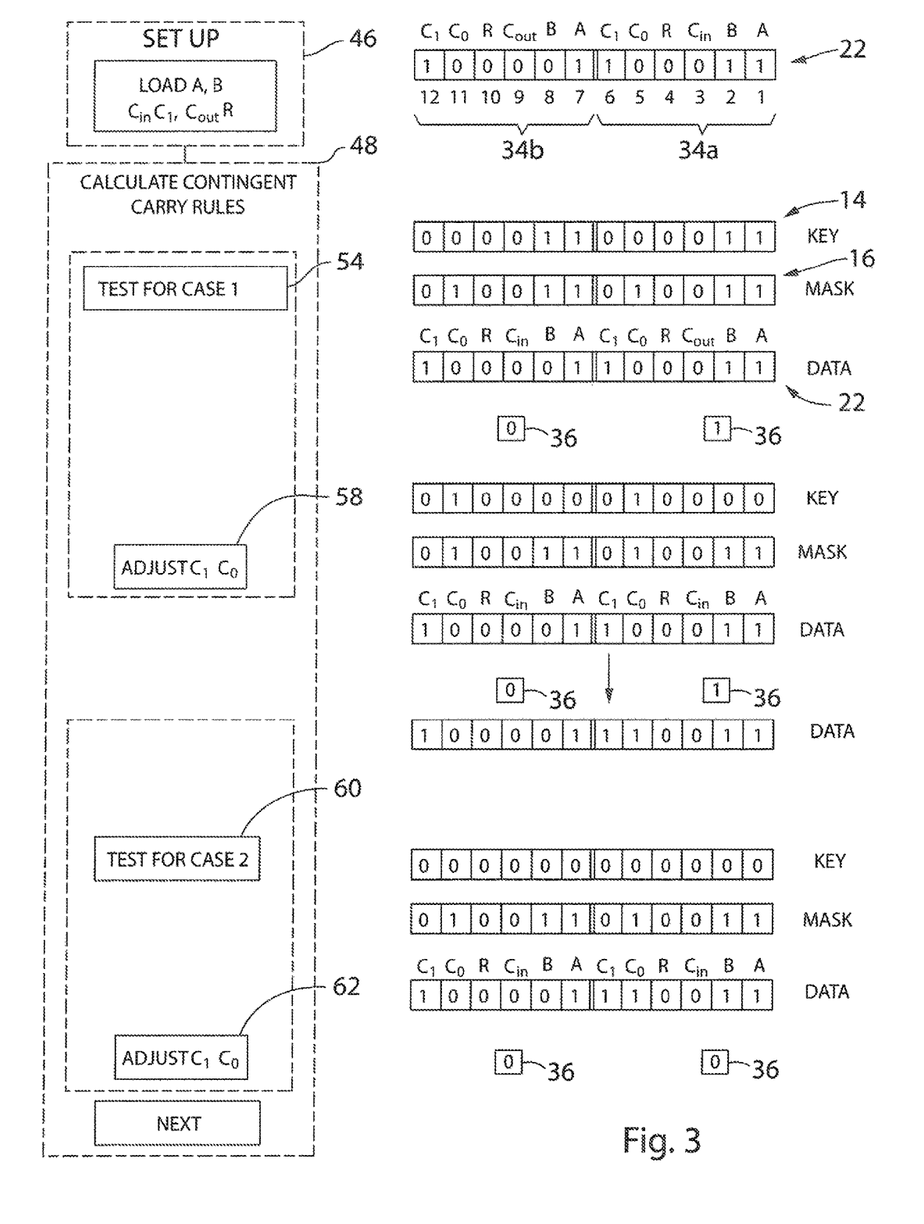
FIG. 3 is an expanded flowchart of the first two steps of the set up and contingent carry relationship calculation.

Referring now to FIG. 3, an example will be provided for the addition of two, two-bit operands A, B where operand A is equal to 3 (1 1 binary) and operand B is equal to 1 (0 1 binary). In this example, for clarity, each subword 34 is a single bit of each operand A and B.

At the set up block 46, data is loaded into a word 22 with the least significant bits of operands A and B loaded into a right or least significant subword 34a and the most significant bits of operands A, and B loaded into the left or most significant subword 34b as depicted. Thus for a 12-bit word 22, first subword 34a will comprise bits 1-6 and the second subword 34b will comprise bits 7-12. The least significant bit of operands A and B are loaded respectively into bits 1 and 2 of the word 22, and the most significant bits of operands A and B are loaded respectively into bits 7 and 8 of the word 22. Bits 3 and 9 provide for carry-in bit $C_{in}$ values for these respective subwords 34 which will be initially set to 0. The actual value of the carry-in bits $C_{in}$ will normally be unknown except for the first subword 34a where there is an implicit $C_{in}$ value of 0 because there are no previous subwords 34. Bits 4 and 10 provide for a result output for each of the subwords 34 also unknown at this point. Finally bits 5 and 6 of subword 34 and bits 11 and 12 of subword 34 described the contingent carry relationship for the subword 34 recording an expected carry-out bit $C_{out}$ for the subword 34 for the two cases where the carry-in bit $C_{in}$ (as yet unknown) is either a 0 or 1 respectively. This relationship will be explained in greater detail below and is recorded in bits designated $C_0$ and $C_1$ The set up process of block 46 may be repeated for each word 22 in the associative processor 10.

Referring still to FIG. 3, at process block 48 (shown also in FIG. 2) a determination of the contingent carry relationship (defining a carry-out bit $C_{out}$ for each subword 34 based on two different possible carry-in bit $C_{in}$ values of 0 and 1) may be performed by applying two search patterns to each bit pair of the operands A and B. For a multibit sub word 34, this process will occur in a serial fashion within each sub word 34 moving from bit to bit and using the contingent carry bits $C_0$ and $C_1$ for each previously computed bit.

Referring now to the following Table I, it can be seen that there are eight possible combinations of bit values of A, B and $C_{in}$ that define carry-out bit $C_{out}$.

TABLE I

|   | $C_{in}$ | B | A | $C_{out}$ |
|---|---|---|---|---|
| 1 | 0 | 0 | 0 | 0 |
| 2 | 0 | 0 | 1 | 0 |
| 3 | 0 | 1 | 0 | 0 |
| 4 (case 1) | 0 | 1 | 1 | 1 |
| 5 (case 2) | 1 | 0 | 0 | 0 |
| 6 | 1 | 0 | 1 | 1 |
| 7 | 1 | 1 | 0 | 1 |
| 8 | 1 | 1 | 1 | 1 |

In most of these combinations (rows 1-3 and 6-8) the carry-out bit $C_{out}$ is equal to the carry-in bit $C_{in}$. This is expressed by a default setting of $C_1$ to 1 and $C_0$ to 0 where the value of $C_1$ will express the carry-out bit $C_{out}$ with a contingency of the carry-in bit $C_{in}$ being 1, and the value of $C_0$ will express the carry-out bit $C_{out}$ with a contingency of the carry-in bit $C_{in}$ being 0.

Only two rows (4, 5) violate this convention and thus require a changing of the default values of $C_1$ and $C_0$. These two conditions (designated case 1 and case 2) are by test searches indicated by process blocks 54 and 62 and the values of $C_1$ and $C_0$ changed as appropriate when these conditions are found as indicated by condition resets of process blocks 58 and 62.

In the first test case indicated by process block 54, a search of all words 22 will be conducted with the key registers for each subword 34 set to {0, 0, 0, 0, 1, 1} and in the mask register set to {0, 1, 0, 0, 1, 1} thus checking for the condition where operands A and B are each 1 and $C_0$ is not already set to 1. This condition occurs only in subword 34a. Accordingly, at the conclusion of this search of process block 54, subword tag bit 36 for subword 34a will be set and subword tag bit 36 for subword 34b will not be set.

At subsequent process block 58, a write is then conducted of all subwords 34 of words 22 using key registers for each subword 34 set to {0, 1, 0, 0, 0, 0} and in the mask register set to {0, 1, 0, 0, 0, 0}. This writing process will only apply to subword 34a by virtue of only its subword tag bit 36 being set to 1 and will write a 1 into the value of $C_0$ for subword 34a indicating that the carry-out bit $C_{out}$ will always be 1 regardless of the carry-in bit $C_{in}$. In contrast the values of $C_1$ and $C_0$ for subword 34b will indicate that the carry-out bit $C_{out}$ will be identical to the carry-in bit $C_{in}$.

As indicated by process block 60, it is then necessary to test for case 2 of the above Table I. In this test, a search of all words 22 will be conducted with the key registers 14 for each subword 34 set to {0, 1, 0, 0, 0, 0} and in the mask register 16 set to {0, 1, 0, 0, 1, 1} thus checking for the condition where operands A and B are each 0 and $C_0$ is not already set to 0.

This condition is true for neither subword 34a nor 34b, and accordingly, at the conclusion of this search of process block 60 subword tag bit 36 for both subword 34a and 34b will be reset and so no adjustment to the values of $C_1$ and $C_0$ need to be performed in this example. Although not shown in detail, another set carry process per process block 62, similar to process block 58, may be conducted setting the value of $C_1$ to 0 for all subwords 34 matching the test condition of the test case of process block 60 per process block 62.

At this point contingency carry bits $C_1$ and $C_0$ have been set for each word 22. In cases where the subwords 34 are multiple bits, values of $C_1$ and $C_0$ are recorded only for each subword 34, and accordingly, the search process of process blocks 54, 58, 60, and 62 may be conducted in bit serial form from the least significant to the most significant bits of each operand A and B within each subword 34. The contingent carry relationship for each bit may be applied to the contingent carry relationship derived for the succeeding bit to produce a recorded contingent carry relationship for the succeeding bit and so forth in order to provide the contingent carry relationship for the subword 34.

Specifically, the contingent carry bits $C_1$ and $C_0$ of the first bit of each subword 34 are determined using Table I for the first bit pair (A, B) by evaluating $C_0$ based on an assumption that $C_{in}$ is 0 and evaluating $C_1$ based on an assumption that $C_{in}$ is 1. This can be done on all subwords 34 in parallel for the first bit pairs of those subwords 34. Next, looking at the second bit pairs of the subword 34 and still using Table I, $C_0$ is evaluated based on an assumption that $C_{in}$ is the previously evaluated $C_0$ of the previous bits and $C_1$ is evaluated based on an assumption $C_{in}$ is $C_1$ as determined for the previous bit pair. This provides a single collective value of $C_1$ and $C_0$ for the collected first and second bit pairs. The second step is then repeated for each successive bit pair of the subword 34 until at the end of this process yields a collected value for $C_0$ and $C_1$ for the entire subword 34. That is, a value for $C_0$ and $C_1$ is determined that can be used to find $C_{out}$ for the entire subword 34 in one step once $C_{in}$ for that subword 34 is known.

Referring to FIG. 2, at process block 50, once the contingent carry relationships have been determined for each subword 34, an actual carry value maybe propagated through each subwords 34 starting with the least significant subword 34 using the following Table II in which "x" indicates a "don't care" state.

TABLE II

| $C_{in}$ (current subword) | $C_0$ (current subword) | $C_1$ (current subword) | $C_{in}$ (next subword) |
|---|---|---|---|
| 0 | 1 | x | 1 |
| 1 | x | 1 | 1 |
| | otherwise | | 0 |

During standard addition operations, the value of $C_{in}$ will be 0 but other values of $C_{in}$ are possible, for example, if subtraction is being performed and it is desired to invert all the bits of one of the operands. Generally, when a carry-in bit $C_{in}$ is 1, $C_1$ is used as the carry-out $C_{out}$ bit. Conversely, when a carry-in bit $C_{in}$ is 0, $C_0$ is used as the carry-out $C_{out}$ bit. This process may evaluate only the subwords 34 and therefore is faster than a carry propagation through each of the bits of the word 22 for arguments A and B.

Figure 4:
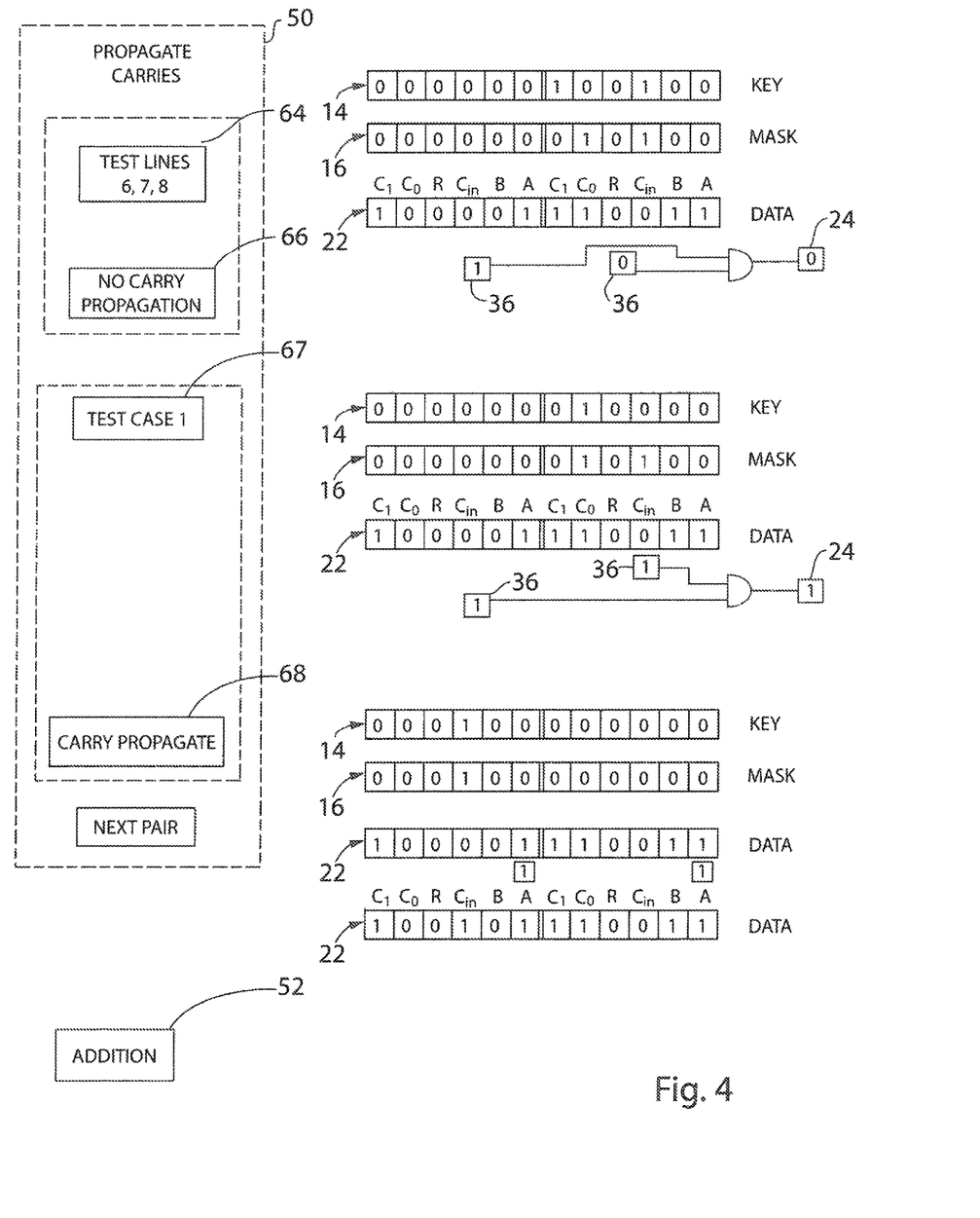
FIG. 4 is expanded flowchart of the second two steps of carry propagation and addition.

Referring to FIG. 4, at process block 64, successive subwords 34 are first examined to see if the carry-in bit $C_{in}$ of the first subword 34 would produce a carry-out bit $C_{out}$ of 1 to the next subword 34 according to rows 6, 7, and 8 of Table I. In the example of FIGS. 3 and 4, this employs a search of all words 22 on a pairwise basis of successive subwords 34 using a key register 14 spanning two subwords 34 of {0, 0, 0, 0, 0, 0, 1, 0, 0, 1, 0, 0} with the mask register 16 set to {0, 0, 0, 0, 0, 0, 1, 0, 0, 1, 0, 0} thus checking for the condition where $C_{in}$ of the first subword 34a is 1 and $C_1$ is 1 indicating that a carry bit should occur contingent on $C_{in}$ being 1 (as it is). The search conducted with respect to subword 34b is simply a null search which is always true. In this case only word tag bit 24 is used (being a logical AND of subword tag bits 36), and in the example, because both of subword tag bits 36 are not set (subword tag bit 36 for subword 34a is reset), there is no carry propagation as indicated by process block 66. An example of carry propagation will be provided below.

Continuing with the example at process block 67, case 1 (row 4 in Table I) is tested by performing a search on the same pairwise basis using the same pair as selected above. In the example of FIGS. 3 and 4, this employs a search of all words 22 on a pairwise basis using a key register 14 {0, 0, 0, 0, 0, 0, 0, 1, 0, 0, 0, 0}, and the mask register 16 is set to {0, 0, 0, 0, 0, 0, 0, 1, 0, 1, 0, 0} thus checking for the condition where $C_{in}$ of the first operand bit 44 is 0 and $C_0$ is 1 indicating that a carry bit should occur contingent on $C_{in}$ being 0 (as it is). Again, a search conducted with respect to subword 34a is simply a null search which is always true. In this case word tag bit 24 is considered only, and in the example because both subword tag bits 36 are set, a carry propagation will now be provided as indicated by process block 68.

In this carry propagation, a write will occur to all words 22 having their word tag bit 24 set.

In the example of FIGS. 3 and 4, this employs a write of all words 22 on a pairwise basis targeting the same pair of subwords 34 as previously searched. At this time, the key register 14 is set to {0, 0, 0, 1, 0, 0, 0, 0, 0, 0, 0, 0} and the mask register 16 set to {0, 0, 0, 1, 0, 0, 0, 0, 0, 0, 0, 0} thus setting the carry-in $C_{in}$ bit for the second subword 34b implementing a carry from subword 34a to subword 34b.

At this point, carries have been propagated through each subword 34 of the example, and as indicated by process block 52 of FIG. 2, a carry-less addition may then be implemented in parallel on all subwords 34 in bit serial fashion within the subwords 34. This carry-less addition is implemented by testing each pair of bits from operands A and B in order for the following cases of Table III for each in a similar procedure as described above.

TABLE III

|  | $C_{in}$ | B | A | R | $C_{out}$ |
|---|---|---|---|---|---|
| 1 (no change) | 0 | 0 | 0 | 0 | 0 |
| 2 | 0 | 0 | 1 | 1 | 0 |
| 3 | 0 | 1 | 0 | 1 | 0 |
| 4 | 0 | 1 | 1 | 0 | 1 |
| 5 | 1 | 0 | 0 | 1 | 0 |
| 6 (no change) | 1 | 0 | 1 | 0 | 1 |
| 7 (no change) | 1 | 1 | 0 | 0 | 1 |
| 8 | 1 | 1 | 1 | 1 | 1 |

It will be noted that for the example of FIGS. 3 and 4, all carries have been precomputed and rows 1, 6, and 7 do not change the result bit R. Accordingly only the conditions of 2, 3, 4, 5, and 8 need to be tested. In this testing process, which will not be depicted, a search is made for each of the patterns represented by the second, third, and fourth columns ($C_{in}$, B, A) and, where a bit set 40 matches those patterns, providing a write to the R bit.

In the more general case of a multibit subword 34, both the R bit and $C_{out}$ bits will need to be written and accordingly all but the first row must be tested.

Figure 5:
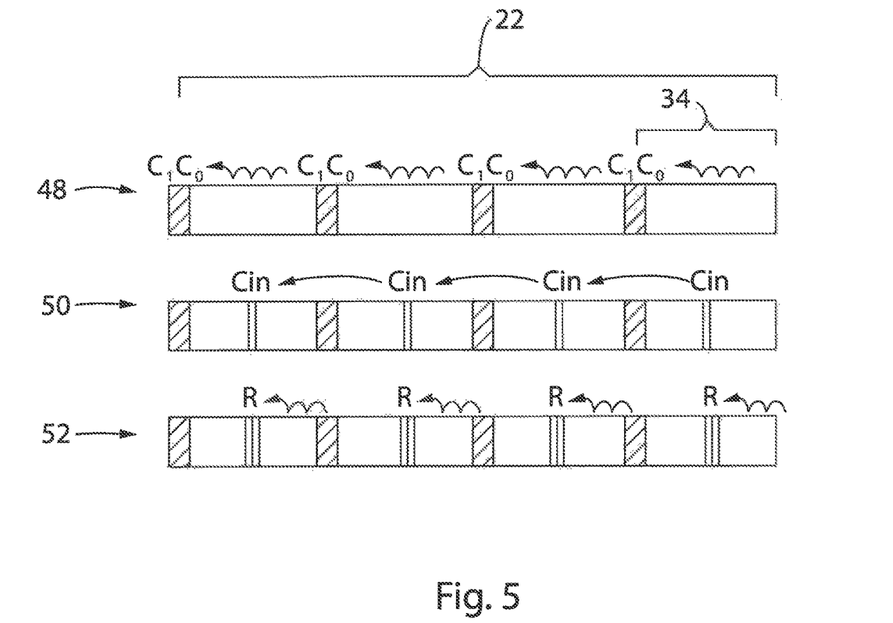
FIG. 5 is a flow diagram showing the parallel and serial operation implemented with respect to the subwords employed by the present invention.

Referring now to FIGS. 2 and 5, in the case of a multibit subword 34, the first step of calculating contingent carry relationships per process block 48 of FIG. 2 involves the application of two search patterns (cases 1 and 2 of Table I above) successively for each of the bits in the subword 34. For a word 22 having a length of m divided into n subwords, this will require 4 m/n (the number of bits in each subword) searches to compute the values of $C_0$, and $C_1$ for the subword 34. This bit-serial process may be conducted in parallel among subwords 34.

In contrast, the propagation of the carry values per process block 50 through each bit element 40 will be a function of the number of subwords 34 and must be conducted in subword serial fashion requiring 2n searches.

Finally the performance of the post carry addition of process block 52 may again be conducted in bit-serial fashion within the subwords 34 and in parallel across subwords 34 requiring 5 m/n searches. The optimum value of dividing a word 22 into subwords 34 can be determined by determining a minimum point for the function $$f(n) = 9\frac{m}{n} + 2n.$$

This produces an optimum value of n of:

$$n = \frac{3}{\sqrt{2}}\sqrt{m}$$

n=m (rounded to the nearest integer value).

Similarly the length of each subword 1 should conform to:

$$\frac{m}{l} = \frac{3}{\sqrt{2}}\sqrt{m}$$

(rounded to the nearest integer value).

Figure 6:
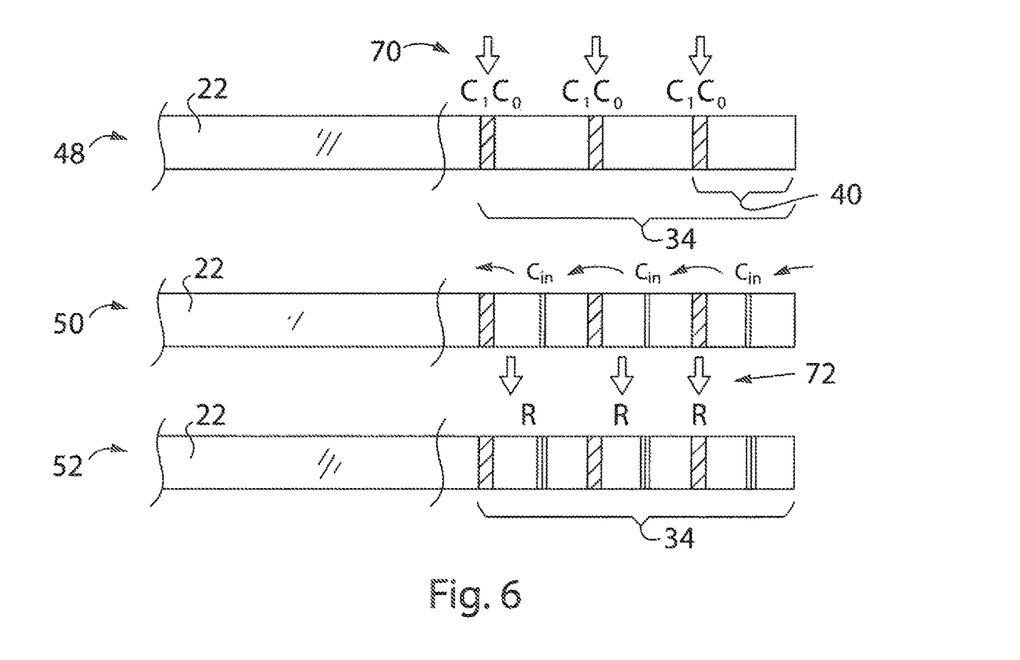
FIG. 6 is a flow diagram similar to FIG. 5 showing parallel and serial operation implemented with single bit subwords.

Referring now to FIGS. 2 and 6, a limiting case for each subword 34 holds only a single pair of bits of the operands A and B, and thus each pair of bits associated with values of $C_0$, $C_1$, and $C_{in}$, the calculation of contingent carry relationships for each bit can be performed in parallel as indicated by arrows resulting in a search burden of 2. Carry propagation can then be performed for each bit with a search burden of 2 m/n. With all the carry-in bits $C_{in}$ calculated, a short form of Table III having only five searches can be used in parallel as indicated by arrows 72 to compute the result values with a search burden of 5 for extremely fast processing that require substantial additional memory.

Although the present disclosure shows only the fundamental operation of addition, it will be appreciated that this additional operation can be readily converted into subtraction through the use of twos complement arithmetic well understood in the art. With addition and subtraction, multiplication and division can be implemented through the use of repeated addition or subtraction operations as is also understood in the art. Multiplication can alternatively be implemented by first allocating a result and setting it to 0. Then multiplying one bit of the first operand by the second operand and adding it to the result using the procedure already explained for addition. Finally shifting the result by one bit. This process is repeated until all of the first operand has been multiplied by the second operand. Although, this method also repeatedly performs additions, fewer number of operations are required compared to implementing multiplication just by performing several additions. Accordingly the present invention provides improved acceleration for fundamental arithmetic operations of addition, subtraction, multiplication, and division.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. An associative processor comprising:
a plurality of rows of content addressable memory, each row operating to define stored data; and
a controller communicating with the rows to search the rows in parallel for a pattern distinct from the stored data and to write to the rows in parallel according to a pattern distinct from the stored data;
the controller operating to:
(a) load each row with stored data representing two words being addends to be summed, each word including multiple subwords;
(b) apply search and write cycles in parallel to the subwords using first predetermined patterns to determine whether an addition of the subwords would produce a carry-out bit under both states of an assumed carry-in bit of one and an assumed carry-in bit of zero to determine a contingent carry relationship of each subword, the search and write cycles providing a logical comparison of the first predetermined patterns to the stored data of the subwords to store a result indicating the contingent carry relationships for the subwords;
(c) apply search and write cycles to the subwords using second predetermined patterns to propagate carry bits through the subwords according to the contingent carry relationship of each subword and a carry-in bit of zero for the least significant subwords, the search and write cycles providing a logical comparison of the second predetermined patterns to the stored data of the subwords to propagate carry bits through the subwords; and
(d) apply search and write cycles on the subwords using third predetermined patterns to add corresponding subwords using the propagated carry bits, the search and write cycles providing a logical comparison of the third predetermined patterns to the stored data of the subwords to add the corresponding carry bits.

2. The associative processor of claim 1 wherein step (b) operates on multibit subwords in parallel.

3. The associative processor of claim 2 wherein step (c) operates on multibit subwords in series.

4. The associative processor of claim 1 wherein step (d) operates on multibit subwords in parallel.

5. The associative processor of claim 1 wherein the subwords have multiple bits of each operand.

6. The associative processor of claim 5 wherein the words are of length m and each subword has a bit length rounded to the nearest integer value of a value indicated by the letter l in the formula:

$$\frac{m}{l} = \frac{3}{\sqrt{2}}\sqrt{m}.$$

7. The associative processor of claim 6 wherein the words are of length 64 and the subwords have a bit length of four.

8. The associative processor of claim 1 wherein the subwords have only a single bit of each operand.

9. The associative processor of claim 1 wherein the first predetermined patterns are limited to two patterns identifying whether corresponding bits of a subword are identical being either both ones or both zeros.

10. The associative processor of claim 1 wherein the third predetermined patterns are limited to patterns in which the added bits produce a result different from a default result loaded into the words.

11. The associative processor of claim 1 wherein the third predetermined patterns are only unique patterns associated with carry-free addition.

12. The associative processor of claim 1 further including a subword tag bit associated with each subword.

13. The associative processor of claim 12 wherein the subword tag bit operates to be set or reset depending on a search applied to the associated subword and to selectively control a writing of the associated subword according to whether the tag bit is set or reset.

14. The associative processor of claim 12 further including a word tag bit associated with each word operating to be set or reset depending on a search applied to the associated word and selectively control a writing of the associated word according to whether it is set or reset and communicating with other word tag bits in a reduction tree circuit.

15. The associative processor of claim 14 wherein the word tag bit of a given word is a logical AND of the subword tag bits on subwords of the given word.

16. The associative processor of claim 12 further including a key register and a mask register wherein the key register holds values for matching or writing and the mask register indicates values that have "don't care" states matching all values during searching and changing no values during writing.

17. The associative processor of claim 16 wherein each bit of each word is associated with a carry-in bit, a first carry-out bit assuming a one-valued carry-in bit, a second carry-out bit assuming a zero-valued carry-in bit, a result bit, and first and second addend bits and wherein the contingent carry relationship is stored in the first and second carry-out bits.

18. An method of operating an associative memory to provide for associative processing, the associative memory providing a plurality of rows of content addressable memory, each row operating to define stored data and a controller communicating with the rows to search the rows in parallel for a pattern distinct from the sorted data and to write to the rows in parallel according to a pattern distinct from the stored data; the method comprising the steps of:

(a) loading each row with stored data representing two words being addends to be summed, each word including multiple subwords representing successive bits of the words;

(b) applying search and write cycles in parallel to the subwords using first predetermined patterns to determine whether an addition of the subwords would produce a carry-out bit under both states of an assumed carry-in bit of one and an assumed carry-in bit of zero to determine a contingent carry relationship of each subword, the search and write cycles providing a logical comparison of the first predetermined patterns to the stored data of the subwords to store a result indicating the contingent carry relationships for the subwords;

(c) applying search and write cycles to the subwords using second predetermined patterns to propagate carry bits through the subwords according to the contingent carry relationship of each subword and a carry-in bit of zero for the least significant subwords, the search and write cycles providing a logical comparison of the second predetermined patterns to the stored data of the subwords to propagate carry bits through the subwords; and (d) applying search and write cycles on the subwords using third predetermined patterns to add corresponding subwords using the propagated carry bits, the search and write cycles providing a logical comparison of the third predetermined patterns to the stored data of the subwords to add the corresponding carry bits.

* * * * *